(12) United States Patent
Cordani et al.

(10) Patent No.: US 10,350,441 B2
(45) Date of Patent: Jul. 16, 2019

(54) AMPHIBIOUS AIRCRAFT FIRE FIGHTING ENHANCEMENT

(71) Applicant: GelTech Solutions, Inc., Jupiter, FL (US)

(72) Inventors: Peter Cordani, Palm Beach Gardens, FL (US); Matthew E. Struzziero, Boulder, CO (US); Edward G. Kleiman, Jupiter, FL (US); Michael C. Story, Mansfield, TX (US); Marc A. Gerth, Keller, TX (US); Reagan G. Bullock, Poolville, TX (US); James B. Story, Highland Village, TX (US); Victor D. Trotter, Fort Worth, TX (US)

(73) Assignee: GelTech Solutions, Inc., Jupiter, FL (US)

( * ) Notice: Subject to any disclaimer, the term of this patent is extended or adjusted under 35 U.S.C. 154(b) by 227 days.

(21) Appl. No.: 15/243,367

(22) Filed: Aug. 22, 2016

(65) Prior Publication Data
US 2017/0072236 A1 Mar. 16, 2017

Related U.S. Application Data

(63) Continuation-in-part of application No. 14/885,389, filed on Oct. 16, 2015, now Pat. No. 9,421,403.

(60) Provisional application No. 62/065,052, filed on Oct. 17, 2014.

(51) Int. Cl.
*A62C 3/02* (2006.01)
*A62C 5/00* (2006.01)
*B64D 1/16* (2006.01)
*A62C 5/033* (2006.01)
*A62C 99/00* (2010.01)

(52) U.S. Cl.
CPC ............ *A62C 5/002* (2013.01); *A62C 3/0228* (2013.01); *A62C 3/0235* (2013.01); *A62C 5/033* (2013.01); *B64D 1/16* (2013.01); *A62C 99/0009* (2013.01)

(58) Field of Classification Search
CPC .... B64D 1/00; B64D 1/16; A62C 3/00; A62C 3/02; A62C 3/0228; A62C 3/0242; B64C 35/00; B64C 35/008
USPC ............................ 169/53; 239/379, 569, 578
See application file for complete search history.

(56) References Cited

U.S. PATENT DOCUMENTS

| | | |
|---|---|---|
| 2013/0112907 A1 | 5/2013 | Doten |
| 2016/0030789 A1 | 2/2016 | Cordani |
| 2016/0030791 A1 | 2/2016 | Doten |

*Primary Examiner* — Christopher S Kim
(74) *Attorney, Agent, or Firm* — McHale & Slavin, P.A.

(57) ABSTRACT

The instant invention relates to an apparatus and method for enhancing the fire extinguishing properties of water for use with fire fighting aircraft. The apparatus and method includes the steps of, and equipment for, transferring media into a holding tank in aircraft; filling a reservoir hopper with water in the aircraft; calculating the amount of media to be added to the reservoir; drawing the calculated amount of media into the reservoir to form an enhanced fire fighting admixture while the aircraft is in flight, wherein the admixture is offloaded by a controlled discharge for use in fighting forest fires.

10 Claims, 8 Drawing Sheets

AMPHIBIOUS AIRCRAFT FIRE FIGHTING ENHANCEMENT

PRIORITY CLAIM

In accordance with 37 C.F.R. 1.76, a claim of priority is included in an Application Data Sheet filed concurrently herewith. Accordingly, the present invention claims priority to U.S. patent application Ser. No. 14/885,389 filed Oct. 15, 2015 and entitled "AMPHIBIOUS AIRCRAFT FIRE FIGHTING ENHANCEMENT" which claims the priority date of U.S. Provisional Patent Application No. 62/065,052 filed Oct. 17, 2014. The contents of the above referenced application are incorporated herein by reference.

FIELD OF THE INVENTION

This invention relates to forest fire fighting and in particular to an apparatus and method for introducing a media into an amphibious aircraft in an amount sufficient to extinguish and prevent conflagrations.

BACKGROUND OF THE INVENTION

Water is well known for its fire extinguishing properties and remains the predominate material used to extinguish or prevent certain types of fires. Water has a high heat capacity and high heat of vaporization such that when water is sprayed onto a fire the water that reaches the flames absorbs the heat of the fire and cools the article to below its combustion temperature. Water also deprives the fire of oxygen. Often the heat of the fire turns a portion of water into vapor before it can reach the flames. Since water vapor is heavier than air it displaces the oxygen surrounding the fire thereby suffocating the fire. When water is dropped from an airplane a portion of the water can evaporated before reaching the fire. Water mixed with fire retardants can enhance the fire extinguishing aspects of the water.

Aircraft have become incredible fire fighting tools when the fire is located in a forest or other remote area. While a plane can hold an incredible about of water, it must land and refill the water tanks before each use. For this reason planes capable of drawing water from a lake have certain advantages. Planes such as the Bombardier 415 are capable of drawing water from a lake for use in dispensing over forest fires. The AT802 Fire Boss holds 400 to 500 gallons of water and is capable of being filled within 12 seconds while the aircraft is skimming over the surface of the water. An advantage to amphibious aircraft is that they can be refilled quickly but are not set up to include fire retardant. A significant disadvantage often encountered using untreated water to extinguish a fire is that much of the water ends up being wasted. Untreated water can evaporate before it can reach the base of the fire, where the combustible fuel for the fire resides. Further upwards of 90% of the water that does manage to reach the flames simply runs off into the ground without remaining on the trees, foliage or structure that is burning. Moreover, considerable effort must be made to continuously soak objects with water near the fire that could ignite. The evaporated and runoff water must be constantly replaced.

Ammonium phosphate fertilizer added to water is another method of firefighting used to slow and cool down a fire. Lockheed P2V's can carry 2,400 gallons of fire fighting fluid. McDonnell Douglas DC-10 may hold up to 12,000 gallons of fire fighting fluid in an exterior belly mounted tank. While this is an effective fire retardant, Forest Service officials were sued to prevent the fire retardant from being dropped near streams and lakes except when human safety is at risk. The substance consists primarily of ammonium phosphate, which has been known to kill off fish. In 2009, when ammonia in retardant dropped on wildfires near Santa Barbara, Calif., the retardant killed protected steelhead trout in the Santa Ynez River. In 2002, a slurry bomber dumped between 1,000 and 2,000 gallons of fire retardant containing sodium ferrocyanide on the Fall River south of Bend, Oreg., which immediately killed all of the river's fish, an estimated 21,000 juvenile brown trout, redband trout and mountain whitefish over a six-mile stretch. Fire retardant manufacturers have cut the ammonium in retardant over the last decade which now affects whether the material is effective.

The purpose of the fire retardant is to give firefighters time to mount a ground attack. Fire retardant is formulated to slow down the combustion of trees, brush, and grass. The ground forces clear away flammable material in a wide line around the edges of the fire. They hem in the flames and eventually a soaking rain falls or the fire just burns itself out.

What is lacking in the art is a device that will increase the effectiveness of water that is picked up by planes without landing by integrating an apparatus for introducing a media, such a as a super absorbent polymer, into amphibious aircraft.

SUMMARY OF THE INVENTION

The instant invention discloses a system for introducing media into a liquid reservoir of an airplane capable of drawing water from a lake to form an admixture of water and media for application onto forest fires.

In one embodiment a predetermined amount of dry super absorbent polymer is placed into the liquid reservoir of an amphibious airplane forming an admixture having enhanced fire fighting properties for distribution over a forest fire.

An objective of the invention is to teach a system for a fire fighting airplane that can mix a media with water without the need for the airplane to return to base after each fire drop.

Another objective of the invention is to present a system that uses super absorbent polymers to transform water into an admixture effective for fire extinguishment or prevention. This admixture will bring fires under control more quickly, offering substantially less water consumption and substantially more time saving. The admixed super absorbent polymer may be applied to any source of combustible material in anticipation of a fire for fire retardation or directly at a source of combustible material already flaming for fire extinguishment.

Another objective of the present invention is to provide a device used in conjunction with an airplane providing a means for conditioning each tank of collected water.

Another objective of the invention is to provide a method of filling a media hopper, which is located inside the aircraft structure, without requiring personnel to climb onto the aircraft.

Still another objective of the invention is to provide a method of keeping media in a media hopper dry and to influence media flow so full emptying of the media hopper can be accomplished.

Yet another objective of the invention is to disclose a method of adding the correct amount of media to water in the main hopper and meter the correct amount of media and to avoid clumping/clogging.

Still another objective of the invention is to disclose a method of homogeneously mixing the media and water with a means to break up any clumps of media that form.

Another objective of this invention is to disclose a media dispensing/mixing system having minimum modifications to the aircraft, a design to allow the media hopper to be installed through an existing vent opening at the top of the aircraft and the use of an adaptor that installs between a main hopper and a gate box.

Yet another objective of the present invention is to teach a hydrated super absorbent polymer having a viscosity that allows the polymers to be emptied through the additive inlet and the gel to be dispensed without clogging or blocking.

Another objective of the instant invention is to teach the use of a lightweight polymer that allows an aviation tanker to carry sufficient polymer to treat multiple batches of water without exceeding aircraft maximum weight. The preferred embodiment is to use 100 grams per 2.5 gallons of water.

Another objective of the instant invention is to disclose a super absorbent polymer that meets U.S. Forest Service Specifications 5100-306A and is non toxic to mammals.

Still another objective of the invention is to disclose a system that allows personnel to fill the media hopper located inside the aircraft structure, without requiring personnel to climb onto the aircraft.

Still another objective of the invention is to disclose a system that keeps media dry until mixed with water, the dry media allows for uniform measurement and flow.

Still another objective of the invention is to disclose a system that allows for the correct amount of media to be added to the water in the main hopper. The firefighting ability of the media water mixture is greatly influenced by the mixing ratio. The correct metering of media into the water is complicated by the tendency of the media to "clump" or "clog" as it moves through the system piping. Means were invented to meter the correct amount of media and to avoid clumping/clogging.

Yet still another objective of the invention is to disclose a system that allows a system to be installed with minimum modifications to the aircraft. This involved special designs to allow the media hopper to be installed through the existing vent opening at the top of the aircraft and the use of a special adaptor that installs between the existing main hopper and the gate box. All of the main plumping runs through the adaptor thus avoiding significant modifications to the main hopper.

Other objectives and advantages of this invention will become apparent from the following description taken in conjunction with any accompanying drawings wherein are set forth, by way of illustration and example, and certain embodiments of this invention. Any drawings contained herein constitute a part of this specification and include exemplary embodiments of the present invention and illustrate various objects and features thereof.

BRIEF DESCRIPTION OF THE DRAWINGS

FIG. 1 is a flow schematic of the system using a screw auger;

FIG. 2 is a pictorial flow diagram of the system using an air driven pump;

FIG. 3 is an enlarged pictorial flow diagram of the media hopper loading system of FIG. 12;

FIG. 4 is an enlarged pictorial flow diagram of the media transfer and metering system of FIG. 12;

FIG. 5 is an enlarged pictorial flow diagram of the media mixing and pumping system of FIG. 12; and FIG. 6 is an enlarged pictorial flow diagram of the media transfer and metering system of FIG. 12.

FIG. 7 is a pictorial view of the system using a metering and mixing component for adding media to fluid; and FIG. 8 is a pictorial of the cockpit controller interface.

DETAILED DESCRIPTION OF THE PREFERRED EMBODIMENT

A detailed embodiment of the preferred embodiment of the instant invention is disclosed herein, however, it is to be understood that the disclosed embodiments are merely exemplary of the invention, which may be embodied in various forms. Therefore, specific functional and structural details disclosed herein are not to be interpreted as limiting, but merely as a basis for the claims and as a representative basis for teaching one skilled in the art to various employ the present invention in virtually any appropriately detailed structure.

Disclosed is a system to mix, in the correct ratio, GelTech Fire Ice media with water contained in the main hopper of an Air Tractor AT 802 Fire Boss or other aircraft intended for air tanker service. The system will carry enough media product, in a separate media hopper on board the aircraft, to allow the aircraft to make several drops, reload the main hopper with water by scooping water from a lake or other suitable body of water. Once the main hopper has been refilled with water the media dispensing system will dispense the required amount of media into the water in the main hopper thus improving the firefighting capability of the aircraft. The desired characteristic of the mixture is set by the pilot from inside the cockpit or, alternatively, by remote operators using the wireless communication capability built into the system controller. An onboard computer will calculate the correct amount of media to be dispensed based on the water in the main hopper, the amount of media in the media hopper, and the mixture property set by the cockpit personnel. The property of the mixture may be adjusted based on the water temperature or the viscosity of the mixture. In the preferred embodiment the amount of media dispensed is determined by the amount of water in the main hopper and the desired mixing ratio. Dispensing and system operation are controlled by an onboard computer. Sample specifications for the AT802 Fire Boss/GelTech mixing system are Media Hopper capacity of 34 Gallons of FIRE-ICE® media and a main hopper capacity: 450 to 500 gallons of water or water/media mixture. Approximately six tank drops can be made before the media hopper requires refilling.

The media described herein are preferably super absorbent polymers used in combination with the fire fighting equipment. The super absorbent polymers are water-soluble polymers that include cross-linking structures that render an aspect of the polymers water-insoluble. By taking water-soluble ethylenically unsaturated monomers which readily undergo vinyl polymerization, such as acrylamide, with cross-linking agents, a polymer can be produced that is of uniform small size, has a water retention capacity, is highly insoluble, but highly water-swellable (i.e., super absorbent polymer). The gel capacity refers to the property of the water-swollen polymer to resist viscosity changes as a result of mechanical working or milling. The use such polymers is disclosed in U.S. patent application Ser. No. 14/731,458 Colorized Fire Extinguishing Compositions, the contents of which is incorporated herein by reference.

The media is extremely lightweight which has a unique benefit when added to airplanes having a critical center of gravity. When an airplane wing is subjected to an airstream, lift according to Bernoullian airfoil design is generated along a line that is approximately two-thirds of the chord from the leading edge. The center of gravity for the airplane must be very close to the center of lift in order to be controllable. Shifting of weight in a plane can quickly lead to an uncontrollable situation. The AT802 Fire Boss, which holds 400 to 500 gallons of water and is capable of being filled within 12 seconds, transfers tons of water weight onto the plane. The airplane is at max capacity so the addition of any liquid additive is not possible. However, it has been found that a large area of the plane is open and can be easily filed with dry polymer media which enhances the fire extinguishing properties and the weight.

In one embodiment, the Applicant employs a screw auger that transfers a predetermined amount of super absorbent dry media into the liquid holding tank before water is drawn into the tank by skimming the plane over a body of water to refill the tank. The screw auger includes devices such as yoke conveyors, screw conveyors, or the like. Unique to the application is that the dry media is very light and easily transferred.

The polymeric material is a dehydrated super absorbent polymer. The dehydrated super absorbent polymer has negligible weight when stored in a dry condition. The present invention introduces the polymer into the water for use in helping the retarding or extinguishing conflagrations or water in an amount sufficient to retard or extinguish the fire. The preferred embodiment utilizes biodegradable super absorbent aqueous based polymers sold under the trademark FIREICE® which meets U.S. Forest Service Specifications 5100-306A.

Super absorbent polymer particles are capable of absorbing water in significant quantities relative to its own weight; the water-swollen gel provides a greater water laden surface area, with a higher heat capacity, than the unbound water molecule. Thus, more water actually reaches the fire without being evaporated and provides more cooling. A fire can be extinguished using less water. Aside from its water soluble properties super absorbent polymers do not harden and do not require time to "cure".

Figure 1:
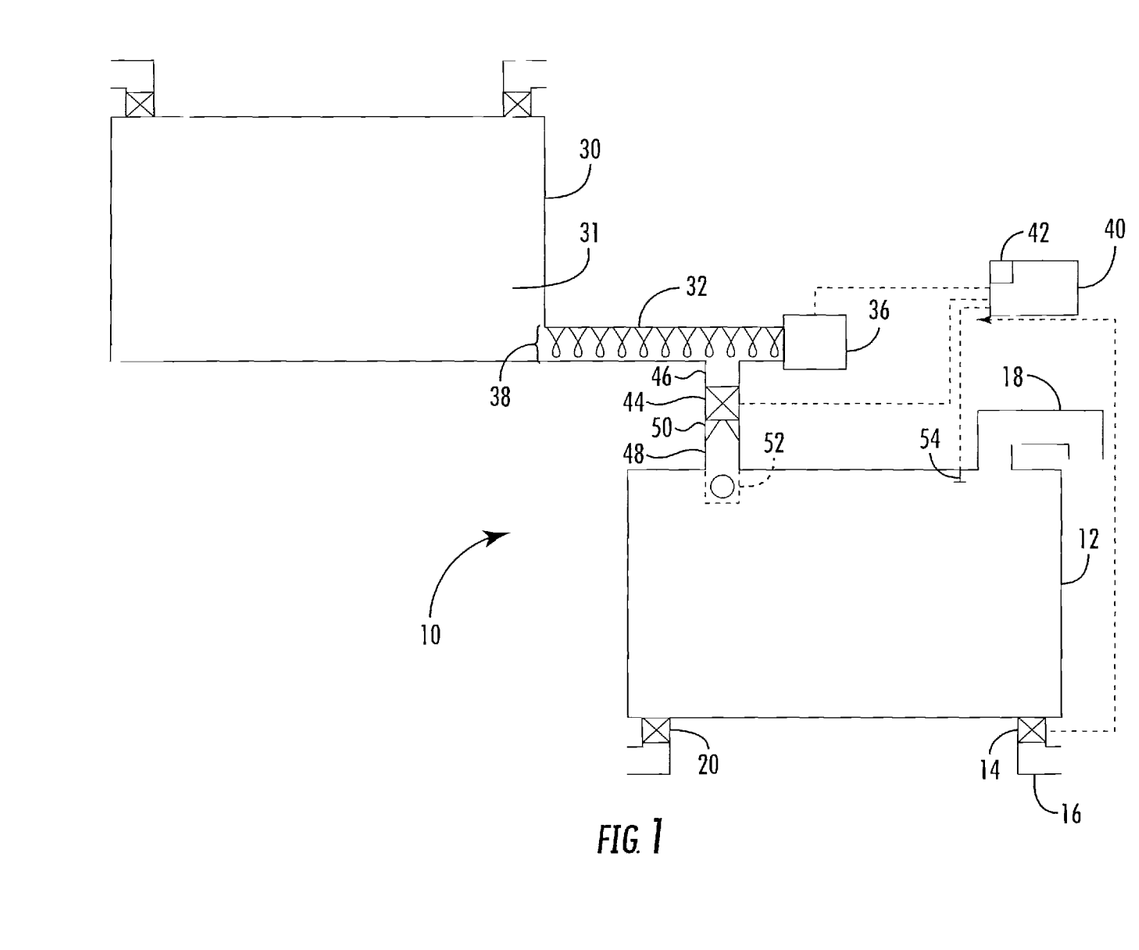
Figure 2:
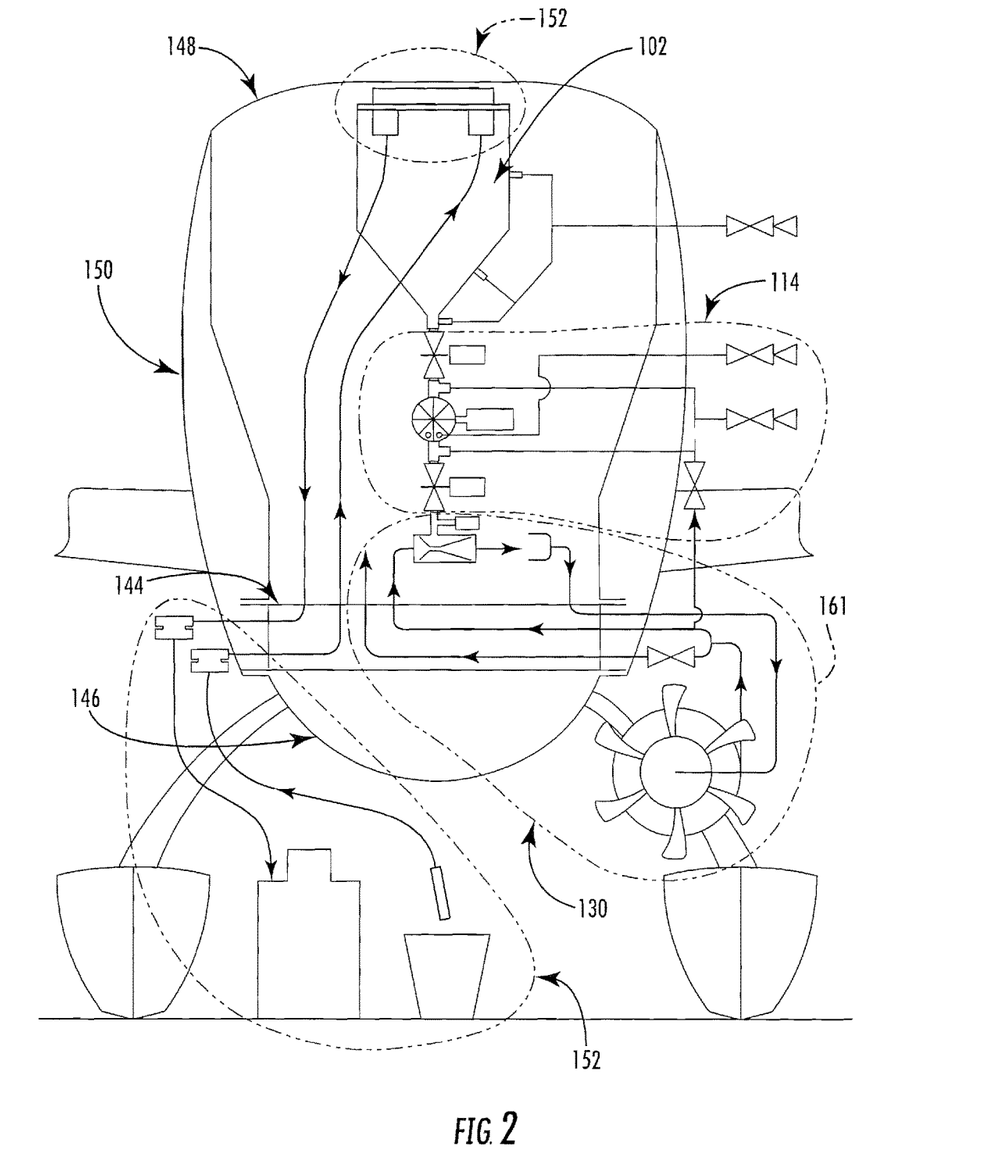
Figure 3:
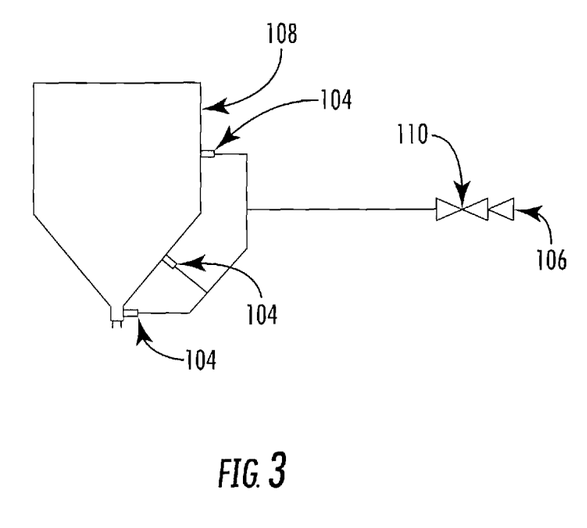
Figure 4:
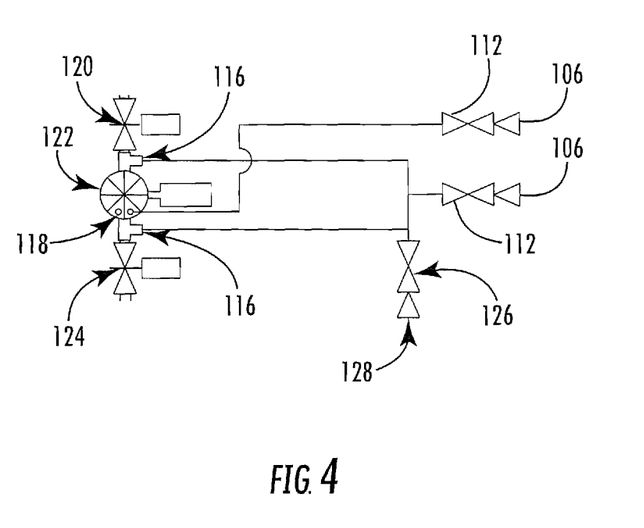
Figure 5:
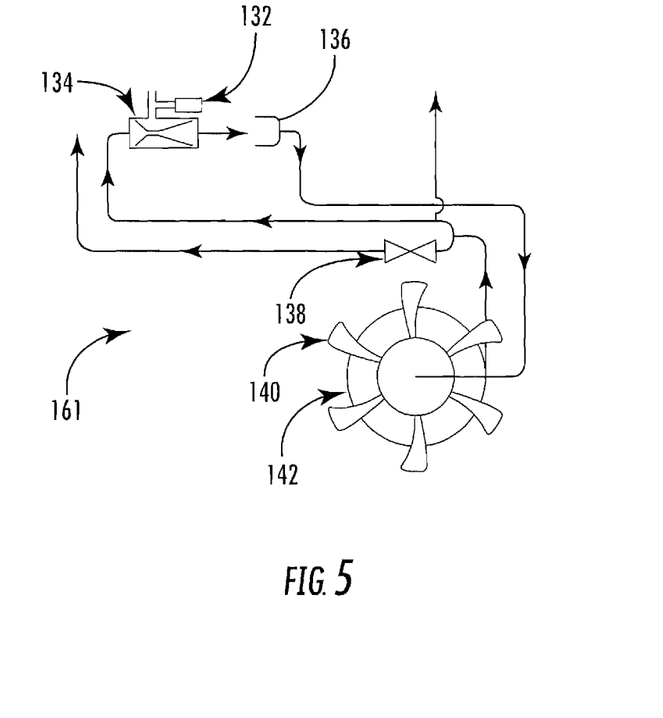
Figure 6:
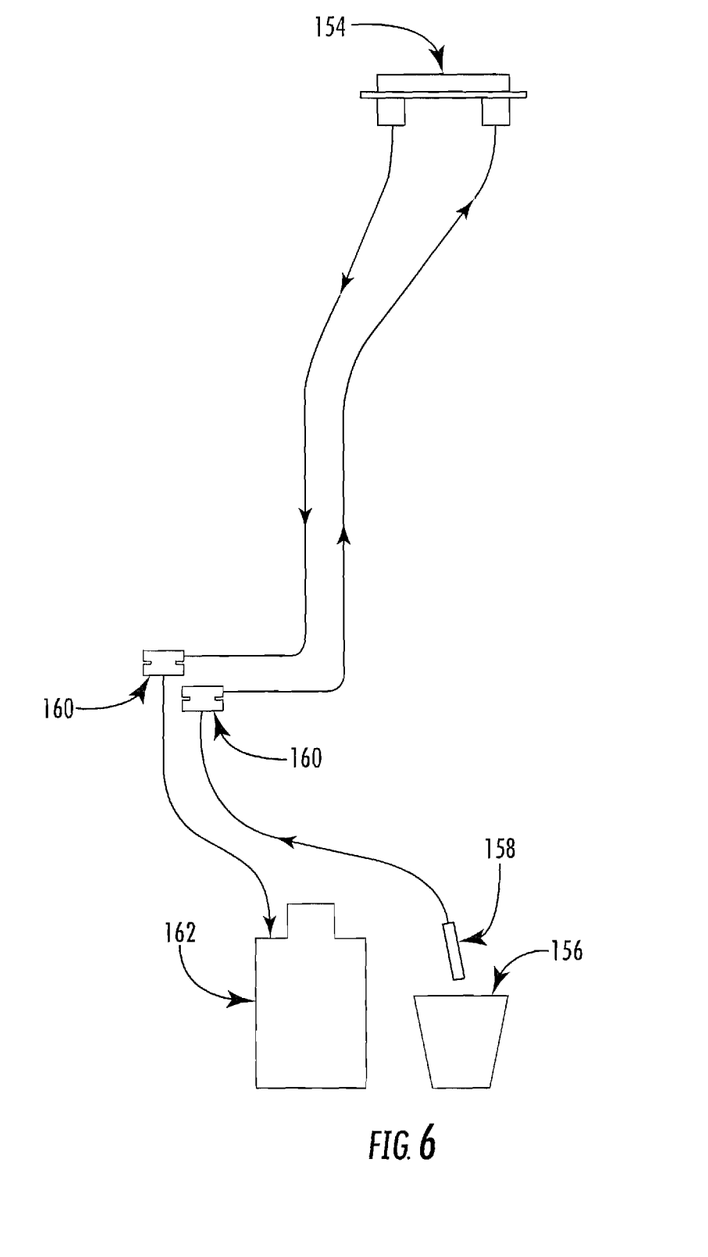

In one embodiment, as shown in FIG. 1, a system 10 for enhancing the fire extinguishing properties of water for use with an amphibious airplane is disclosed. The amphibious airplane, such as the AT802 Fire Boss, has a 400 to 500 gallon liquid holding reservoir 12. An inlet 14 to the liquid holding reservoir 12 consists of a scoop 16 that is skimmed along the surface of a water source which allows the filling of the liquid holding reservoir 12 in about twelve seconds. A tank relief 18 prevents over-pressurizing of the liquid reservoir 12 during filling and permits air replacement during release. A release bay 20 is operated by the airplane crew for release of liquid held within the liquid reservoir 12.

The storage vessel 30 is placed within the fuselage of the airplane. The storage vessel 30 can be a plastic container or individual bags containing super absorbent polymeric material. A volumetric screw feeder 32 is attached to the storage vessel 30 for introducing a predetermined amount of super absorbent polymeric material into said liquid reservoir 12. The screw feeder 32 employs an injection screw 34 that is gear driven by an electric motor 36. The polymer placed with the storage vessel 30 flows freely to the inlet 38 of the injection screw 34. Alternatively an eductor can be placed in the intake line 14 to eliminate the need for a screw feeder. The eductor operates to drawn dry media into the water stream during the filing of the reservoir.

Before liquid is added to the liquid reservoir 12, a volumetric amount of polymer is added to the liquid reservoir 12. The liquid reservoir 12 is then filled with water when the plane skims across a body of water, such as a lake, wherein the scoop 16 is opened to receive water into the liquid reservoir 12. The large influx of water creates an immediate mixing of water and polymer. Within the time the plane returns to the fire area the polymer is fully saturated with water.

A controller 40 is preferably provided to a crew member wherein the electric motor 36 is remotely controlled to introduce a volumetric amount of polymer material. The controller 40 includes a timer 42 to allow operation of the electric motor 36 for a predetermined amount of time. The result is operation of the screw feeder 32 for the predetermined amount of time causing transfer of a calculated amount of dry super absorbent polymer from the storage vessel 30 into the liquid reservoir 12. A valve 44 is positioned between the exit 46 of the screw feeder 32 and an inlet 48 of the liquid reservoir 12. The valve 44 is a normally closed solenoid valve to prevent the flow of fluid from entering the screw feeder 32 and saturating the super absorbent polymer before placement within the liquid reservoir 12. In an open position only, the super absorbent polymer is permitted to be passed into the liquid reservoir 12. The valve 44 is coupled to the controller 40 allowing simultaneous operation with electric motor 36. A check valve 50, such as a Tideflex duckbill style check valve designed for passage of media material, operates as backup to the solenoid valve 44. In addition, a stainless steel ball valve 52 prohibits flow of water into the solenoid valve 44 recalling that the tanker flow rate into the liquid reservoir 12 is 1600 gallons within 12 seconds. To prevent accidental operation of the electric motor 36 when the liquid reservoir 12 is filled, the controller 40 is electrically coupled to the level sensor 54 located within the liquid reservoir 12. Operation of the controller 40 provides electrical control of the solenoid valve 44 only when the liquid reservoir 12 is empty. Mechanical redundancy is provided by the check valve 50 that allows singular passage of the polymer media. In addition, steel ball valve 52 blocks the inlet 48 during the inrush of water caused when the scoop 16 is placed in the water and the inlet solenoid 14 is opened. Preferably the inlet 14 is coupled to the controller 40 to disable operation of the screw feeder 32 and solenoid valve 44 when the scoop 16 is open.

The result is the screw feeder 32 introduces a predetermined amount of super absorbent polymeric material 31 stored within the storage vessel 30 to be transferred into the liquid reservoir 12 when the liquid reservoir 12 is empty. The liquid reservoir 12 is then available for dispensing the admixture of polymer and water thereby enhancing the fire extinguishing properties of the water.

When the polymer material 31 is added to the water, a super absorbent gel-like substance is formed. In a dry state the preferred polymer may be considered a particle having a diameter less than 4000 microns but greater than 50 microns. In a swollen state the particle may have a diameter greater than three hundred times its original diameter in a dry state (more surface area). In a totally water-swollen state, the particles contain up to 99.98 weight percent of water and as little as about 0.1 weight percent of polymer. Thus, such particles could hold an amount of water from ten to thousands of times their own weight.

In one embodiment, the media is loaded from containers at ground level into the media hopper located on the aircraft. The requirement is to avoid a time consuming effort by ground support personnel to climb onto the aircraft for the purpose of loading media into the media hopper. The media hopper is located inside the main water hopper on the aircraft the media hopper carries the supply of media until it is required for blending with the water supply in the main hopper. The hopper must keep the media dry by isolating the media from the metering components located downstream of the hopper. In addition, the media hopper has the capability of agitating the stored media to aid in the uniform and complete dispensing of the stored media.

The media hopper access is normally at the top of the main media hopper and is about 15 feet off of the ground. The requirement for the media loading system is to allow ground support personnel to load the media hopper without climbing onto the aircraft. In one embodiment, a mechanical conveyor belt from ground to the loading port at the top of the media hopper can be used. In another embodiment, a mechanical auger/tube to convey media to the loading port at the top of the media hopper. Still another embodiment uses a vacuum system that will pull air through the media hopper. The vacuum source can be on the aircraft or can be a ground based vacuum pump that is powered by a ground based power source. The vacuum source attaches to plumbing built into the aircraft. The attachment point for the vacuum suction line can be accessible from the ground. The plumbing for the suction line goes from the lower attachment point on the lower portion of the aircraft to the suction port of the media hopper. In this embodiment a ground based operator can attach a flexible suction line to the lower suction connection and direct this flow line either directly into the factory supplied container of media or attach the flow line to the suction port of a system supplied media container. The flow rate/velocity in the suction flow line has to be sufficient to entrain the media and carry it from the media supply on the ground into the media hopper on the aircraft (can be as much as a 15 foot lift).

Another option for drawing media from the factory container into the flow line is for the ground support person to simply hold onto the flow line, remove the lid from the factory container and insert the flow line into the media inside the container. This has the advantages of being simple and, if the media was "cliffing" or clumping, the operator can move the flow line around inside the factory container to stir and retrieve all of the media.

Another option is for the loading system to have its own media container and plumbing. In this version the operator would fill the system media container from the factory container. The system media container will have plumbing to stir the media using turbulence generated by the flow stream created when the vacuum source is engaged.

The flow suction line that goes from the media source on the ground to the media hopper is transporting a mixture of media and air. When this mixture of media and air enters the media hopper it must be separated. The media remains in the media hopper and the air exits the media hopper and travels on to the vacuum source. Therefore, incorporated into the inlet port on the media hopper is a separator to separate the media from the air. The media will remain in the media hopper and the air that had entrained the media will flow from the hopper to the vacuum source. This will fill the media hopper on the aircraft. The inlet port and flow separator can be made into the media hopper lid.

A means of separating the media and air is to cause the air/media mixture to swirl in a cyclonic fashion. Since media is denser than the air the heavier media will be forced to the outer portion if the cyclonic pattern while the lighter air can fill the inner portion of the cyclonic pattern. Properly placed inlet and outlet ports in combination with flow baffles will separate the media from the air.

Another means of separation also relies on the different densities of the media and air but this method does not use a cyclonic flow pattern. Rather this method uses linear flow paths which incorporate one or more sharp turns. The placement of the inlet and outlet ports relative to the baffles will force the flow pattern to make sharp turns around the baffles. The heavier media will be thrown out of the flow stream while the lighter air makes the sharp turn and proceeds out of the media hopper and travels to the vacuum source.

Another means of separation is to place a correctly sized filter in the flow path. The filter will stop the media while allowing the air pass through and continue to the vacuum source. The media is stored on the aircraft until it is needed to mix with water in the main hopper. The media must be stored until it is mixed with the on board water supply. In addition to storing the media the media hopper has to keep the media dry and allow the complete feeding of all of the stored media. The media hopper has sufficient capacity to allow mixing with several main hoppers full of water. This means the aircraft can make multiple drops with a mixture of water and media without returning the base to refill with media. This greatly increases the amount of firefighting mixture an aircraft can deliver in a unit of time.

The separator separates the media from the transport air once the media enters the media hopper. The separation can be an integral part of the media hopper lid such as a cyclonic separator built into media hopper lid. The media hopper includes a means to draw all of the media from the media hopper. The media is hydroscopic and easily forms clumps therefore must be kept dry and isolated from the water supply. An isolation valve is located between media hopper and the metering pump which is closed unless metering. A second isolation valve is located between the metering pump and mixing subsystem. As media is withdrawn it will tend to "cliff" or form a hole in the area above the media hopper outlet port. If "cliffing" occurs not all of the media will be withdrawn from the hopper. To avoid "cliffing" blow air into the media hopper to "fluidize" the media so it will not cliff and will flow uniformly out of the outlet port.

The bottom of the media hopper is slanted and transitions smoothly in the outlet port opening. This will use gravity to influence the media to flow to the outlet port and help avoid "cliffing". A mechanical mixer can be used to stir the media inside the hopper. A mechanical means can be used to vibrate the media hopper as a means to agitate the media inside the hopper.

A sounder or ultrasonic means can be used to agitate the media inside the hopper. The hopper can incorporate a flexible hopper wall or membrane that can flex and loosen the media. The required amount of media from the media hopper is metered into the mixing subsystem components. This subsystem performs several functions, namely metering the proper amount of media into the water, keeping the media dry, and preventing the media from clumping and restricting or completely blocking the flow path.

Located downstream of the media hopper is the media transfer and metering subsystem. This subsystem must transfer the correct amount of media from the hopper into the mixing subsystem. The transfer subsystem consists of a metering pump, isolation valves and a flushing circuit. The metering subsystem is hydraulically coupled to a flushing circuit to allow the injection of a fluid, air or water, into the flow path of the blending components to insure the media does not "clump". Clumping will alter the ratio of the media being transferred into the mixing subsystem or completely clog. The metering subsystem also contains valves that can close to isolate the blending subsystem and media hopper from the water passing through the mixing subsystem.

The mixing subsystem is where the metered amount of media enters into the water from the main hopper. It is very important that the point of mixing imparts high shear forces (turbulence) to the media as it enters the water. If the mixing is not turbulent the media will not mix homogeneously with the water and poor performance will be realized from the mixture. There are primary and secondary mixing points. The primary point of mixing occurs in a venturi that draws media from the metering pump and injects the media into the throat section of the venturi. The secondary point of mixing is as the media water mixture passes through the main water pump impeller. Any non homogeneous mixture will be mixed as the impeller pumps the mixture through the pump. The media can be metered into the water by either a positive displacement pump such as a piston pump with a fixed volume canister with the means to fill the known volume and then flush the contents into the water; a vane pump with rigid sliding flexible vanes that will deform and allow a clump of media to pass through the pump without stalling or damaging the pump. Flexible vanes allow running with zero clearance to help prevent reverse flow from the mixing chamber to the media hopper. A diaphragm pump, pristaltic pump, or auger pump may be used. The metering pump can be driven by a hydraulic motor, air motor, aircraft air flow, or electric motor that can either be AC synchronous, AC non-synchronous, DC permanent magnet, DC brushless, stepper or a servo motor. The pump can be determined to function properly by detecting a load on Drive means, Current Sensor, Back EMF, Number of pulses and rate (stepper), detect Speed/RPM of drive means, Position Sensor.

The change in weight of the hopper correlates to the amount of media dispensed. The amount of media dispensed can be monitored by time and flow methods. Use of the vacuum generated by a venturi in conjunction with an on/off valve to allow a controlled flowrate for a controlled time to determine the amount of media injected. Use air from the media hopper to force the media to enter an exit pipe and feed a water flow line. By controlling air pressure and time the amount of media dispensed can be controlled.

The system is self-cleaning by flushing any residual media out of metering device and flow path. Keep the cavity of the positive displacement device from clogging by injecting fluid into the cavity as the media enters the device. The fluid forces all of the media out of the cavity during normal metering to insure that a known amount of media is ejected each metering cycle. This is required for accurate metering. The fluid can be air.

The valves and plumbing into and out of the metering pump are kept clear to prevent partial or complete clogging. Cleaning may occur by injecting fluid into the media flow path in or just downstream of the on/off valve located at the exit of the media hopper. Fluid can be air. The fluid can be injected into the media flow path in or just downstream of the on/off valve located at the exit of the metering pump. Fluid can be air. A negative pressure is maintained on the outlet side of the metering pump. This will insure flow out of the metering pump is into the mixing device.

The media is mixed with the water from the main hopper. The mixture is returned to the main hopper. The media does not naturally mix to form a homogeneous mixture. The mixing method has to introduce shear forces that are sufficient to cause the media to be thoroughly mixed. Once mixed the media/water mixture is stable no further work is required.

The media is injected into a water flow stream. In one embodiment the media free fall for the exit port of the metering pump into the flow stream. Alternatively the media is ingested into the flow stream by having a flow from the metering pump exit to the point on ingestion. The pressure at the ingestion point can be lower than the metering pump exit. The metering pump can exit directly into communication with the suction port of the water transfer pump. The metering pump can exit in communication with the lower pressure port of a venturi or the media mixture can be forced into the flow stream.

The media can be mixed with the water at the point of ingestion by use of a venturi with a significant turbulence at the throat (point of ingestion) to cause the media to be sheared into small particles that will stay suspended in the water. The media can be introduced at the main transfer pump wherein the point of media ingestion is up stream of the fluid transfer pump and plumbed to pass the media/water mixture through the pump impeller. The act of going through the pump impeller will place very high shear loads on the media and achieve uniform and complete mixing of the water and media. After the exit of the fluid transfer pump place a series of shear plates (turbulence generators) in the flow stream. Forcing the media/water mixture through a series of shear generators will force the uniform mixing if the media and water.

The water is pumped through the main hopper and media mixing circuits by either an electric motor, hydraulic motor, power take off (PTO) from aircraft power plant, a separate power plant, or preferably a propeller placed in the airstream of the aircraft and driving the pump. The water is circulated with the media mixture through the main hopper until the desired mixing ratio or viscosity is achieved. Media can be added in known amounts to the water as it circulates until a desired mixing ration or viscosity has been achieved. The viscosity of the water/media mixture can be measured in real or near real time. Media is added to the water until the desired mixing ratio or viscosity has been obtained. The mixing subsystem is where the metered amount of media enters into the water from the main hopper. It is very important that the point of mixing imparts high shear forces (turbulence) to the media as it enters the water. If the mixing is not turbulent the media will not mix homogeneously with the water and poor performance will be realized from the mixture. There are primary and secondary mixing points. The primary point of mixing occurs in a venturi that draws media from the metering pump and injects the media into the throat section of the venturi. The secondary point of mixing is as the media water mixture passes through the main water pump impeller. Any non homogeneous mixture will be mixed as the impeller pumps the mixture through the pump.

Viscosity measuring methods include an electronic meter to send an electronic signal to on board computer or an orifice can be used.

The flow path in main hopper includes a discharge from the main water circulating pump which is split to allow some of the discharge flow to pass through the mixing subsystem while the remainder of the flow goes into the main hopper. The discharge line going into the main hopper incorporates a restriction that can be adjusted. This feature allows the fine tuning of the mixing process.

The venturi discharges in close proximity to the pump intake line such that the discharge flow from the venturi can recirculate through the main pump. The intake line for the main pump is open to the main hopper and pulls fluid from both the main hopper and the venturi discharge. A secondary media mixing method consists of the discharge line from the point of adding media into the water flow stream is routed toward the main pump intake to send the media/water mixture through the impeller of the pump to insure homogeneous mixing of the media and water. A subsystem of shear plates or flow interrupters in the flow path before the media water mixture reenters the main hopper can be used to introduce high shearing forces into the flow stream thus insuring the complete mixing of the media and water.

The mixture is controlled by a control computer that is programmed to: open and close the appropriate valves at the appropriate time and start the metering means and control the amount of media dispensed. The system allows the pilot to start and stop the mixing process from the cockpit of the aircraft. The pilot, or alternatively a remote operator, can select the desired mixing ratio or viscosity from his location in the cockpit of the aircraft. Once the pilot, or alternatively a remote operator, selects the desired ratio or viscosity, the system will determine the amount of water in the main hopper and calculate the correct amount of media to be dispensed for that amount of water to yield a true mixing ratio controller.

The mixing ratio can be automatically adjusted based on the temperature of the water in the main hopper. The mixture viscosity is monitored, in real or near real time, and media added until the desired viscosity is obtained. Using wireless technology, the computer allows others to remotely set the mixture characteristics. The pilot can, from the cockpit, select the desired mixture ratio. If equipped with a viscosity meter the pilot may also select the desired viscosity. In either event the on board computer will control the mixing process to achieve the desired results.

The super absorbent polymer is capable of absorbing water up to several thousand times its own weight. The super absorbent polymer is prepared from water-soluble polymers, but have cross-linking structures that render the polymers water-insoluble. By taking water-soluble ethylenically unsaturated monomers which readily undergo vinyl polymerization, such as acrylamide, with cross-linking agents, a polymer can be produced that is of uniform small size, has a high gel capacity, is highly insoluble, but highly water-swellable (i.e., super absorbent polymer). The super absorbent polymeric material is selected from the group consisting of cross-linked modified polyacrylamides, potassium acrylate, polyacrylamides, sodium acrylate, carboxymethylcellulose, alginic acid, cross-linked starches and crosslinked polyaminoacids.

To achieve maximum fire extinguishing properties, about 3 tablespoons of the polymer is added to about 2.5 gallons of water. This allows the plane to carry an extensive amount of polymer which is essentially weightless allowing the amphibious aircraft to carry a very large volumetric amount of dry polymer without affecting the weight/balance of the plane. This allows the plane to refill the liquid vessel many times with the enhanced fire fighting admixture before landing. The goal would be to match the storage vessel capacity with the estimated loads the plane can carry before landing and refueling.

Referring now to the Figures in general, the media hopper 102 employs fluidizing injector nozzles 104 using air for injection. The injection nozzles 104 assist in fluidizing the media to avoid cliffing and clumping. An air injection pump 106 is coupled to a control valve 110 for the fluidizing air fluid. Control valves 112 allow for metering circuit cleaning fluid—air. A media transfer and metering subsystem 114 is located downstream of the media hopper 102. This subsystem 114 must transfer the correct amount of media from the hopper 102 into the mixing subsystem. The transfer subsystem consists of fluid injection nozzles 116 for metering cleaning/cleaning using air or water. Fluid injection nozzles 118 allow for metering clearing/cleaning using air. An isolation valve 120 is before a metering pump 122. The media hopper 102, located inside the aircraft, carries the supply of media until it is required for blending with the water supply in the main 148. The media hopper 102 must keep the media dry by isolating the media from the metering components located downstream of the hopper. In addition, the media hopper 102 has the capability of agitating the stored media to aid in the uniform and complete dispensing of the stored media.

The metering subsystem is plumbed with a flushing circuit to allow the injection of a fluid (air or water) into the flow path of the blending components to insure the media does not "clump". Clumping will alter the ratio of the media being transferred into the mixing subsystem. In the worst case, if not sufficiently flushed, the metering subsystem can completely clog.

The metering subsystem 114 also contains valves that can close to isolate the blending subsystem and media 102 from the water passing through the mixing subsystem. An isolation valve 124 is positioned after the metering pump 122. A control valve 126 providing for metering of circuit cleaning fluid, namely water. A water supply metering circuit 128 is used for cleaning nozzles. Media mixing and pumping system 130 employs a fluid transfer pump 142 driven by a propeller 140 located outside the aircraft. A mixing venture 134 has an inlet configuration for the fluid transfer by pass valve 138. A vacuum sensor 132 detects no flow conditions. The mixing subsystem is where the metered amount of media enters into the water from the main hopper 148. It is very important that the point of mixing imparts high shear forces (turbulence) to the media as it enters the water. If the mixing is not turbulent the media will not mix homogeneously with the water and poor performance will be realized from the mixture. There are primary and secondary mixing points. The primary point of mixing occurs in a venturi 134 that draws media from the metering pump 122 and injects the media into the throat section of the venture 134.

A secondary point of mixing is as the media water mixture passes through the main water pump 142 impeller. Any non-homogeneous mixture will be mixed as the impeller pumps the mixture through the pump.

Water from the main hopper 148 is circulated through the mixing subsystem where the media is mixed and returned to the main hopper 148. The circulation may be repeated numerous times, with additional media being added on each circulation. Recirculation will continue until the desired mixture ratio or viscosity is obtained. The circulation may also be separated such that some of the flow returns to the main hopper 148 while a smaller portion passes back through the mixing subsystem. The adaptor 144 is used to attach the main hopper 148 to the fire gate 146. The media hopper 102, metering and mixing subsystems are designed to be retrofitted to aircraft with a minimum of modifications to the aircraft. An adaptor is installed between the bottom of the main hopper 148 and the gate box 146. Plumbing required for the installation of the media dispensing system passes through the adaptor thus minimizing the need to modify the main hopper 148, fire gate or aircraft structure.

The fire gate/gate box 146 includes the main hopper 148 placed within the outer skin 150 of the airplane. The media hopper 102 loading system 152 includes a cyclonic separator 154 which draws media from a container 156 using a media pick up nozzle 158. Media is drawn using a vacuum source 162 though vacuum line connections 153. Ram air and vent tubes 155 are used in further media agitation and movement.

The airplane pilot can, from the cockpit, select the desired mixture ratio. If equipped with a viscosity meter the pilot may also select the desired viscosity. In either event the on board computer will control the mixing process to achieve the desired results. A controller display 200 is preferably mounted in the aircraft cockpit. A power on/off switch provides operational power to the system. The display screen 204 is changeable by use of a menu shortcut key 206 and a selection knob 208 that can be rotated to display predetermined menu items and depressed for selection. Shortcut keys include a media key 210 wherein the display screen 204 indicated the quantity of media in the media hopper by percentage. A mix key 212 starts the mixing process with indicator lights 214 that flash during the mixing process. A ratio key 216 is used to adjust the ratio of media to water with the ratio shown on the display screen. Indicator lights 220 notify of system status, sufficient air pressure is indicated by a steady display light 222 and purging light 224 indicates when the system is being purged.

Without wishing to be bound to any particular theory it is believed that since the polymer particles are capable of absorbing water in significant quantities relative to its own weight, the water-swollen gel provides a greater water laden surface area, with a higher heat capacity, than the unbound water molecule. More water actually reaches the fire without being evaporated and provides more cooling. Thus, a fire can be extinguished using less water.

The reaction of the water with the polymer creates a gel-like substance with a viscosity that allows the mixture to be dropped with greater accuracy and viscous enough to cover and adhere to vertical and horizontal surfaces of structures to act as barrier to prevent fire from damaging such structures, minimizing the manpower and water supply needed to continuously soak these structures. The material can be colored to enhance visually depiction of water drops, both in the air and coatings on the ground.

All patents and publications mentioned in this specification are indicative of the levels of those skilled in the art to which the invention pertains. It is to be understood that while a certain form of the invention is illustrated, it is not to be limited to the specific form or arrangement herein described and shown. It will be apparent to those skilled in the art that various changes may be made without departing from the scope of the invention and the invention is not to be considered limited to what is shown and described in the specification and drawings/figures.

One skilled in the art will readily appreciate that the present invention is well adapted to carry out the objectives and obtain the ends and advantages mentioned, as well as those inherent therein. The embodiments, methods, procedures and techniques described herein are presently representative of the preferred embodiments, are intended to be exemplary and are not intended as limitations on the scope. Changes therein and other uses will occur to those skilled in the art which are encompassed within the spirit of the invention. Although the invention has been described in connection with specific preferred embodiments, it should be understood that the invention should not be unduly limited to such specific embodiments.

What is claimed is:

1. A system for enhancing the fire extinguishing properties of water for use with an airplane having a main hopper filled with water, said system comprising:

a media hopper positioned within the airplane;

loading means for placing super absorbent polymeric material into said media hopper;

a metering pump for transferring a predetermined amount of super absorbent polymeric material from said media hopper into said main hopper; and a water pump to recirculate water and super absorbent polymeric material within said main hopper to form an admixture;

wherein said admixture is discharged over a forest fire.

2. The system according to claim 1 including a separator coupled to said media hopper wherein said super absorbent polymeric material is swirled in a cyclonic pattern to permit separation from air.

3. The system according to claim 1 including a means for agitating super absorbent polymeric material in said media hopper.

4. The system according to claim 1 including a means for admixing super absorbent polymeric material with water in said main hopper.

5. The system according to claim 1 including a controller remotely operated by an airplane crew member for adjusting a ratio of super absorbent polymeric material for injection into said main hopper, said controller controlling said metering pump.

6. The system according to claim 5 wherein said metering pump is a flexible vane metering pump.

7. The system according to claim 1 including a venturi to ingest and mix the super absorbent polymeric material with water.

8. The system according to claim 7 wherein said venturi includes a means to stop water from reverse flowing.

9. The system according to claim 1 wherein said water pump is operated by the forward movement of the aircraft.

10. The system according to claim 1 wherein said super absorbent polymeric material is selected from the group consisting of cross-linked modified polyacrylamides, potassium acrylate, ployacrylamides, sodium acrylate, carboxymethylcellulose, alginic acid, cross-linked starches and cross-linked polyaminoacids.

* * * * *